United States Patent [19]
Huignard

[11] 4,451,151
[45] May 29, 1984

[54] OPTICAL DEVICE FOR SUSTAINING A RADIANT ENERGY PULSE WHICH CIRCULATES WITHIN A MONOMODE WAVE GUIDE A GYROMETER AND A HYDROPHONE EQUIPPED WITH SAID OPTICAL DEVICE

[75] Inventor: Jean-Pierre Huignard, Paris, France

[73] Assignee: Thomson-CSF, Paris, France

[21] Appl. No.: 351,403

[22] Filed: Feb. 23, 1982

[30] Foreign Application Priority Data

Feb. 27, 1981 [FR] France ............................. 81 03989

[51] Int. Cl.³ .................. G01B 9/02; G02B 5/14; G01C 19/58
[52] U.S. Cl. .................... 356/345; 250/227; 356/350; 367/149; 350/96.15
[58] Field of Search ............... 356/345, 350; 350/96.15; 250/227, 231 R, 231 P; 367/149

[56] References Cited

U.S. PATENT DOCUMENTS 4,136,929 1/1979 Suzaki ........................ 350/96.15

FOREIGN PATENT DOCUMENTS 18873 11/1980 European Pat. Off. .
2062301 6/1971 France .
2283424 3/1976 France .
2443076 6/1980 France .

OTHER PUBLICATIONS

Hall et al., "Detector for an Optical-Fiber Acoustic Sensor Using Dynamic Holographic Interferometry", Optics Letters, vol. 5, #11, Nov. 1980, pp. 485–487.
Rashleigh "Acoustic Sensing with a Single Coiled Monomode Fiber" Optics Letters, vol. 5, No. 9, Sep. 1980, pp. 392–394.
Nishihara et al., "Holocoupler: A Novel Coupler for Optical Circuits", IEEE Jour. of Quantum Electronics, Sep. 1975, pp. 794–796.

*Primary Examiner*—Vincent P. McGraw
*Attorney, Agent, or Firm*—Cushman, Darby & Cushman

[57] ABSTRACT

An interaction medium in which a photoinduced phase grating has been permanently recorded beforehand is coupled to the two ends of a monomode waveguide. A first wave which is a pulse travels through said waveguide and interferes with a second pumping wave in order to permit energy transfer from the second pumping wave to the first wave.

12 Claims, 8 Drawing Figures

OPTICAL DEVICE FOR SUSTAINING A RADIANT ENERGY PULSE WHICH CIRCULATES WITHIN A MONOMODE WAVE GUIDE A GYROMETER AND A HYDROPHONE EQUIPPED WITH SAID OPTICAL DEVICE

This invention relates to a device for sustaining a radiant energy pulse which travels within a monomode waveguide and is particularly concerned with the application of said device to a gyrometer and to a hydrophone.

A device of this type finds an application in the field of measurement of small phase shifts between two interfering beams. Thus the waveguide employed in the case of an interferometric gyrometer is designed in the form of a loop which can be a coiled optical fiber having a predetermined number of turns. The angular velocity to be measured in this case is determined by interferometric measurement of a phase shift after one of the interfering beams has passed through the waveguide.

In the field of acoustic detection in an underwater or ocean environment, a monomode optical-fiber hydrophone which operates by elastooptical effect and utilizes the effects of interaction between the acoustic wave to be detected and a monomode optical fiber on which said acoustic wave produces action comprises in particular a monomode optical fiber immersed in the water in which the sound wave propagates. Propagation of said sound wave produces variations in pressure within the propagation medium. As a result of the elastooptical effect, these pressure variations in turn produce variations in the geometrical and optical parameters of the fiber. A wave which propagates within the optical fiber undergoes phase variations which can be detected by interferometry by means of a second monomode optical fiber which forms a reference arm.

However, losses arise at the time of propagation of the light waves within the waveguide considered and this explains the need to position a loss-compensating system on the path of the light wave.

Thus the invention relates to a device for causing a radiant energy pulse produced by a coherent source to travel within an optical waveguide while compensating at each revolution for the losses introduced at the time of propagation. The pulse is thus regenerated at a constant level. By means of the device according to the invention, it is also possible to contemplate amplification of an incident radiant energy pulse by transferring the energy of a pumping beam to the signal. The device thus proposed has the function of causing a radiant energy pulse to travel within a fiber while maintaining the level of the signal irrespective of the number of revolutions which have been completed. In the case of an integration of N revolutions, the device induces larger phase shifts in the signal wave; these phase shifts are more readily measurable.

The present invention is directed to an optical device for sustaining a radiant energy pulse within a monomode waveguide. Said device comprises a monomode optical waveguide in which is passed a first wave consisting of a radiant energy pulse produced by a coherent source. Optical connecting means are optically coupled to the end faces of said waveguide in order to form a circulation loop. The distinctive feature of the invention lies in the fact that the aforesaid optical connecting means consist of an interaction medium in which a phase grating has been photoinduced by the interference of two beams produced by said coherent source. Said interaction medium is coupled to the two end faces of said waveguide through the intermediary of optical focusing means.

Other features of the invention will be more apparent upon consideration of the following description and accompanying drawings, wherein.

The invention utilizes the phenomena of wave coupling at the time of reading of phase gratings. Consideration is therefore given to a phase grating having high diffraction efficiency and permanently recorded on a photosensitive substrate constituted by thick diffracting phase structures photoinduced by refractive index variation within electrooptical crystals, photopolymers or whitened argentic materials.

Materials are in fact currently available for writing phase gratings or holograms having high diffraction efficiency and permitting permanent storage of information. These materials are "thick" with respect to the mean pitch of the photoinduced strata and their behavior at the time of writing and reading is described by the formalism of coupled waves governed by the Bragg relation.

In the simple case of interference of two plane waves which arrive on the photosensitive substrate at the angles of incidence $+\Theta$ and $-\Theta$, the spacing $\Lambda$ of the diffraction planes within the substrate is related to the angle $\Theta$ and to the wavelength by the Bragg equation $2\Lambda \sin \Theta = \lambda$. Conversely, a given grating having a spacing $\Lambda$ will significantly diffract a reading beam of wavelength $\lambda$ if it arrives on the medium at the angle $\Theta$ which is related to $\lambda$ and $\Lambda$ by said Bragg equation. A given grating made up of parallel diffraction planes having a spacing $\Lambda$ can be re-read by a beam having a wavelength $\lambda'$. It is only necessary to ensure that its angle of incidence $\Theta'$ is so adjusted as to ensure that the Bragg law $2\Lambda \sin \Theta' = \lambda'$ is satisfied.

Figure 1:
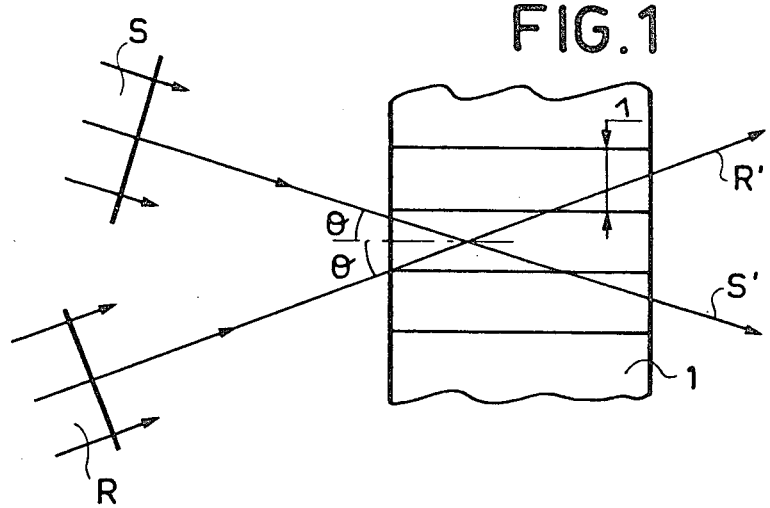
FIGS. 1 to 3 are explanatory diagrams of the operation of the device according to the invention.

If, as shown in FIG. 1, said grating is illuminated by two coherent plane waves R and S emerging from the same laser and having the same intensity, we have the relation $\Lambda = \lambda/(2 \sin \Theta)$.

The spacing $\Lambda$ resulting from the interference of the beams R and S is strictly identical with the spacing of the phase grating. By way of example, the same beams R and S were used for the fabrication of the strata grating which has previously been written.

Within the thickness of the medium considered, the object wave S has thus interfered with a reference wave R having a plane wave front. A pattern of interference fringes has thus been formed and has produced within the crystal a refractive-index strata grating. This strata grating diffracts part of the energy of the reference wave R so as to produce a diffracted wave S', the wave front of which is isomorphous with the object wave front.

Thus, according to the formalism of coupled waves, redistribution of energy takes place between the two beams after these latter have passed through the crystal. This new energy distribution is a function of the relative phase shift $\Psi$ between the two waves. The following notations are thus adopted:

$I_R, I_S$: the intensity of the two interfering waves;

$I_R', I_S'$: the intensity of the two waves at the exit of the crystal;

$\Psi$: the phase shift of the light intensity with respect to the photoinduced phase grating;

$\eta$: the diffraction efficiency of the structure.

The intensities $I_S$ and $I_R$ are obtained respectively by means of the following relationships:

$$I_R' = I_R(1 - \eta) + \eta I_S - 2\sqrt{I_R(1-\eta)I_S\eta}\ \sin\Psi$$

$$I_S' = I_R(1 - \eta) + \eta I_S + 2\sqrt{I_R(1-\eta)I_S\eta}\ \sin\Psi$$

In the particular case of the figure $I_R = I_S = I_O$, hence:

$$I_R' = I_O\left[1 - 2 \times \sqrt{\eta(1-\eta)}\ \sin\Psi\right]$$

$$I_S' = I_O\left[1 + 2 \times \sqrt{\eta(1-\eta)}\ \sin\Psi\right]$$

Optimum energy transfer is therefore achieved when the following conditions have been satisfied simultaneously:

$$\eta = 50\% \quad \Psi = \pi/2$$

In this case, the following values are obtained after traversal of the phase grating:

$$I_R' = 0;\ I_S' = 2I_O$$

Figure 2:
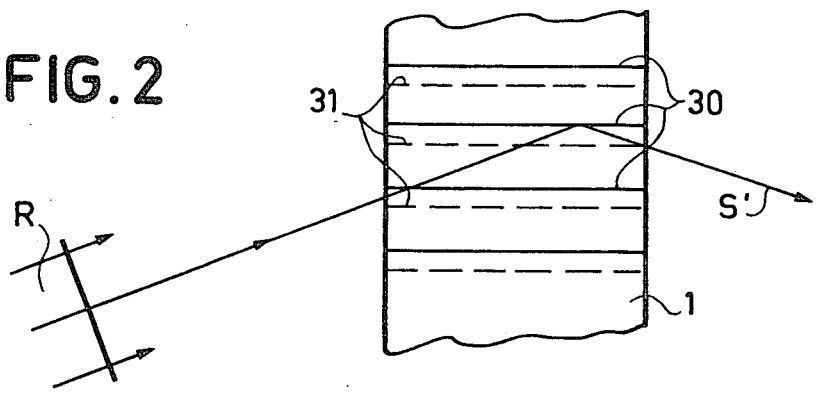

The physical interpretation of the phenomena is as follows: the incident wave R is diffracted by the three-dimensional phase grating. The wave S' thus generated has a phase lag, for example, of $\pi/2$ with respect to the reading wave R. In a medium 1 in which two waves interfere, there is in fact a phase shift of $\pi/2$ between the interference pattern 31 of the two beams and the phase grating 30 as shown in FIG. 2.

On the other hand, the wave R' which is generated by diffraction of the wave S would have a phase lead of $\pi/2$ with respect to said wave S.

Figure 3:
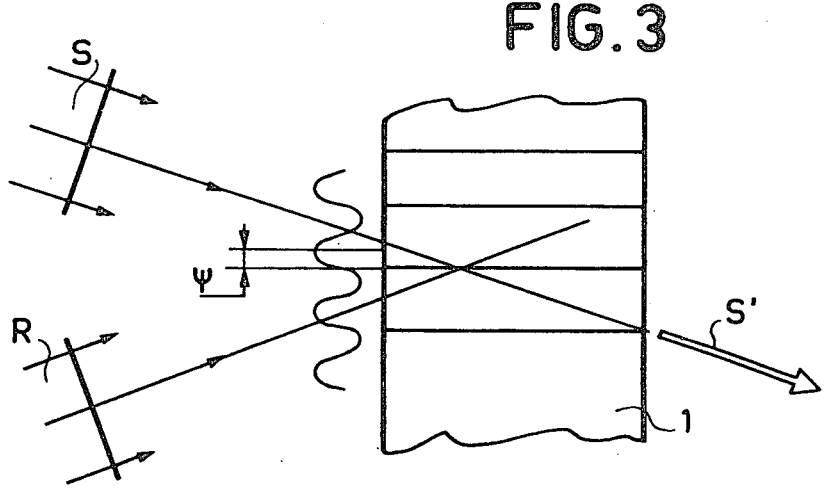

As a result of introduction of a phase shift $\Psi = \pi/2$ between the two waves R and S which arrive in the medium 1, coherent phasing of the generated wave S' and of the incident wave S accordingly takes place. In fact, as shown in FIG. 3 in the case of the wave S', the resultant phase shift with respect to the wave S is $-\pi/2 + \pi/2$; this phase shift is therefore zero. On the other hand, in the case of the wave R', the resultant phase shift with respect to the wave R is $\pi/2 + \pi/2 = \pi$. In consequence, destructive interference takes place in the direction of the beam R and there is therefore a reduction in the energy transmitted directly along R'.

The optimum conditions for energy transfer are satisfied under the following experimental conditions:

$$\eta = 50\%;\ I_R = I_S = I_O;\ \Psi = \pi/2$$

and therefore the gain of $I_S'/I_S$ is equivalent to 3 dB.

These conditions are satisfied by means of a medium 1 formed of gelatin.

Figure 4:
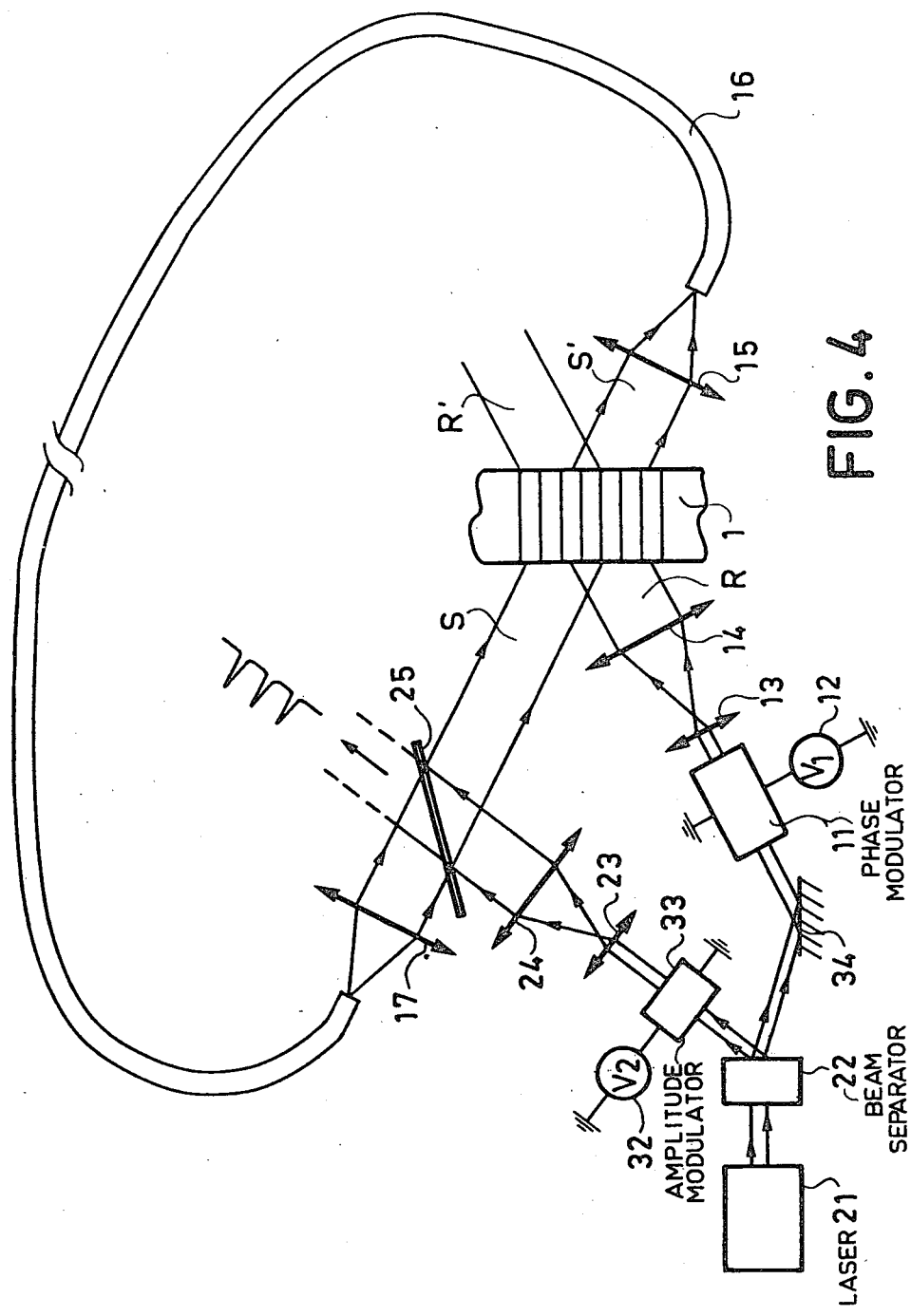
FIG. 4 illustrates one embodiment of the invention.

The device in accordance with the invention and based on the wave coupling phenomena described in the foregoing is illustrated in FIG. 4.

Thus in the case considered, the light intensity pattern of interference of the two beams R and S is phase-shifted by $\pi/2$ with respect to the phase grating. There is consequently obtained a diffracted wave of the wave R on the phase grating, said diffracted wave being superimposed on the transmitted wave S. The result thereby achieved is the same as if the transmitted wave S' had been enriched by a fraction of the energy of the reference wave.

The beam S' which emerges from the grating is coupled to the propagation medium which can consist, for example, of a waveguide or a monomode fiber by means of conventional optical components. In the case considered in FIG. 4, the medium 1 is coupled to the fiber 16 by means of converging lenses 15 and 17.

As shown in FIG. 4, the two beams S and R emerge from the same laser 21 and subsequently pass through a beam-splitter or separator 22.

The beam R passes through a phase modulator 11 and then through a beam-widener composed of two lenses 13 and 14 after having previously been reflected from a mirror 34. The beam S consists of a radiant energy pulse which is initially entered by means of an amplitude modulator 33 controlled by a generator 32. After passing through a beam-widener 23, 24, said pulse is entered into the loop via a splitter plate 25. The pulse is permitted to leave said splitter plate and to circulate within the loop formed by the fiber 16 which is coupled to the medium 1. Said plate may also be removed once the process has been initiated.

Another possible arrangement consists in dispensing with the beam splitter 22, the modulator 33 and the lenses 23 and 24. A radiant energy pulse is first transmitted in the beam R and then, by switching the phase of the laser by $\pi/2$, the operation is performed with the desired beam R.

The signal which passes out of said fiber 16 is reinjected at the entrance of the grating in which it interferes coherently with the wave R delivered by the laser 21. The phase shift $\Psi = \pi/2$ is accurately adjusted by means of the electrooptical phase modulator 11 which is placed on the beam R, for example. Said modulator is controlled by a voltage $V_1$ and losses are adjusted by optical absorption and by coupling of the signal wave S at 3 dB. The losses arising from external coupling of the beam S through a splitter plate 18 are approximately 1 dB and the losses due to coupling between the fiber 16 and the medium 1 and the losses within said fiber 16 are approximately 2 dB.

Under these conditions, the gain obtained by energy transfer of the pumping wave R towards the signal wave S compensates for the losses and the level of the signal pulse remains the same irrespective of the number of traversals through the propagation medium. Good operation of the system entails the need for stability in time of the initial phase condition $\Psi = \pi/2$ and hence the need for very good stability of the mode of the laser source. In regard to the length of coherence of the monomode source, the requirements may be reduced if the transit time $\tau$ of the pulse within the fiber is a multiple of $2l/2$, where l is the length of the laser cavity. In fact, $2l/c$ is the time interval between two maximum values of coherence in the case of a laser cavity. The result thereby achieved is good coherence of operation of the loop formed by the fiber 16 and the medium 1 with respect to the operation of the laser cavity.

The device proposed therefore ensures circulation of an optical pulse within a fiber or monomode waveguide while maintaining a constant signal level irrespective of the number of turns completed by the pulse. The property just mentioned is particularly advantageous in the construction of fiber transducers such as gyrometers, hydrophones and the like, in which a very small modification of the wave phase is integrated over a length L within a propagation medium. Taking into account the compromise to be maintained between the level of detection and absorption of the signal within the propagation medium, it can be demonstrated that any conventional fiber interferometric transducer is limited to an optimum interaction length L deduced from the relation $\alpha L_{op} \simeq 8.7$, where $\alpha$ is the coefficient of absorption of the waveguide in dB/km at the utilization wavelength. This condition corresponds to a reduction in optical power of $1/e^2$.

The device proposed therefore makes it possible to remove this limitation and accordingly induces greater phase shifts in the signal wave. Equivalently, the device permits the use of a microguide of shorter length but having a higher absorption coefficient such as, for example, an annular guide fabricated from $LiNbO_3$: $\alpha \simeq 1$ dB/cm$^{-1}$. The complete optical structure thus presented can be fabricated by means of integrated optical techniques on a single substrate such as $LiNbO_3$. By way of example, the phase grating can be photoinduced by a photorefractive effect in the electrooptical substrate.

Figure 5:
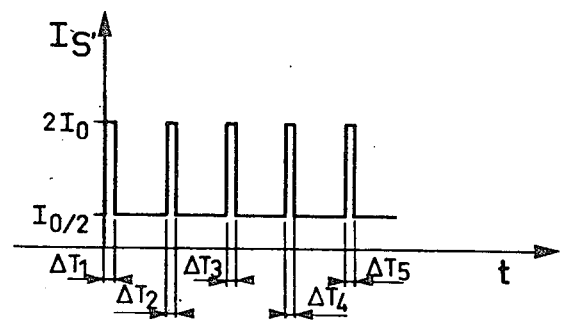
FIGS. 5, 6 and 7 show different waveform diagrams which serve to explain the operation of the device according to the invention.
Figure 6:
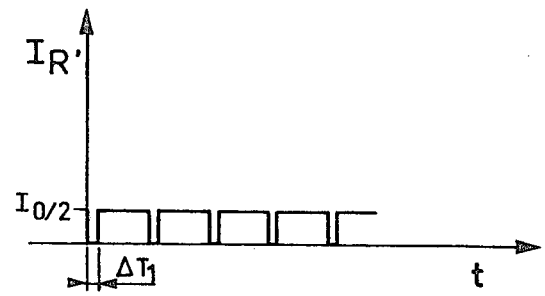

By using the device which is proposed with effective compensation for losses, that is, with $\Psi = \pi/2$, the shape of the signal wave S' is thus represented in FIG. 5 by the light intensity curve $I_S'$ as a function of time. During the time interval $\Delta T$, we have $I_S = 2I_o$ as explained earlier. On the other hand, during the remainder of the period, only that portion of the beam R which is diffracted on the phase grating is transmitted, which corresponds to an intensity of $I_o/2$ by reason of the diffraction efficiency: $\eta = \frac{1}{2}$.

The signal $I_R'$ is complementary to said signal $I_S'$. In fact, during the time interval $\Delta T$, there is no transmission and therefore $I_R' = 0$. During the remainder of the period, only that portion which is derived from the beam R is transmitted and, by reason of the diffraction efficiency $\eta = 0.5$, we have $I_R' = I_o/2$.

Figure 7:
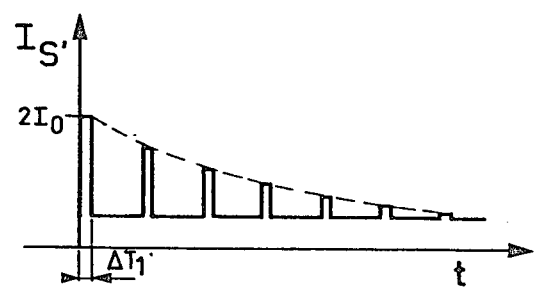

When there is no loss compensation or in other words when $\Psi = 0$, the signal $I_S'$ has the waveform shown in FIG. 7 and the envelope of the pulses has the shape $e^{-\alpha L}$.

Thus, when said device is employed in a gyrometer, the phase modulator is re-adjusted until the signal $I_S'$ has the waveform shown in FIG. 5. This makes it possible to measure the phase shift resulting from rotation of the loop.

In the case of very small induced phase shifts, if the signal pulse is subjected at each traversal to an elementary phase shift $\Delta \phi = 2\pi/\lambda \times L \times \Delta n$, the resultant phase shift in the case of an integration of N revolutions will be:

$$\Delta \phi = N \times 2\pi/\lambda \times L \times \Delta n$$

$$\Delta \phi << \pi/2$$

$\Delta n$ being the variation in the quantity to be measured, namely in this case a variation in refractive index, for example.

Figure 8:
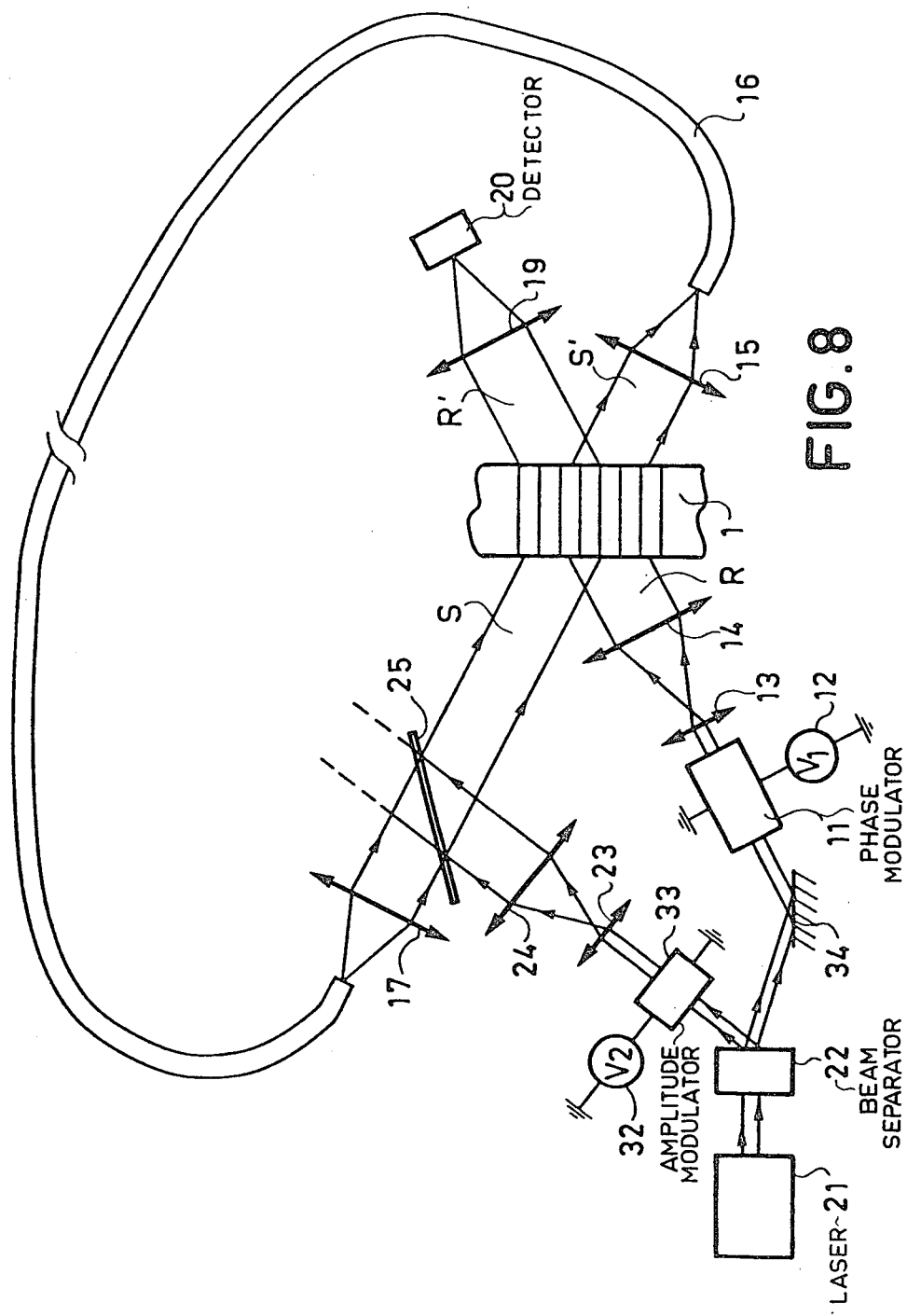
FIG. 8 illustrates another mode of operation of the device according to the invention.

Consideration will accordingly be given to FIG. 8. At the end of the time interval $T = N \times \tau$, where $\tau$ is the transit time within the fiber, there is a slight mismatch of the initial phase condition $\Psi = \pi/2$ and the intensity transmitted in the beam $I_R$ increases. When $\eta = 0.5$, we have during the time intervals $\Delta T_i$:

$$I_R = I_o[1 - \sin(\pi/2 + \phi)]$$

$$I_R = I_o[1 + \cos(\pi + \Delta\Psi)]$$

$$I_R \simeq I_o/2 \times \Delta\Psi^2$$

A detector 20 is then interposed on the beam path after focusing by means of a lens 19. This detector may also be enabled only between the two leading edges of the pulse during the time interval $\Delta T$. Detection of abrupt positive and negative transitions then makes it possible to disable and to enable the detection signal during the time interval $\Delta T$.

A linear detection on $\Delta \Psi$ can be obtained by introducing a relative displacement $\Delta \Psi_o$ with respect to the initial condition $\Psi = \pi/2 - \Delta \Psi_o$ with $\Delta \Psi_o << \pi/2$, and $\Delta \Psi_o > \Delta \Psi$.

During the time intervals $\Delta T_i$, we have:

$$I_R = I_o[1 + \cos(\pi + \Delta\Psi + \Delta\Psi_o)]$$

$$I_R \simeq (I_o/2)[\Delta\Psi_o^2 + 2\Delta\Psi_o\Delta\Psi]$$

$$\Delta I_R \simeq I_o \Delta\Psi_o \Delta\Psi(t)$$

Thus the curve $I_R'$ no longer passes through zero but has minimum values which vary as a function of $\Delta \Psi$ about a straight line parallel to the x-axis having an ordinate $\Delta I_R$ resulting from said phase shift $\Delta \Psi_o$.

$$<I_R> = (I_o/2)\Delta\Psi_o^2.$$

Under these conditions, the contribution to the noise current caused by photons in the photodetector remains at a low level.

$$<i_{ph}^2> = 2e \times \Delta f \times <I_R>.$$

When the mean value $<i_{ph}>$ is non-zero, said detector 20 serves to detect mismatch of the initial phase condition $\Psi = \pi/2$.

Said detection signal can therefore be employed for computing the phase shift which exists within the loop of a gyrometer by reason of the rotation. In fact, by reducing it to zero, it is possible to measure said phase shift and consequently the rotational velocity. By virtue of the invention, said phase shift and said rotational velocity can be of very low value since it is possible to operate with N loop revolutions and thus to increase the resulting effect to a corresponding extent.

In the case of the device of the invention as thus defined, consideration can be given to a length of fiber of 1000 meters, for example, which corresponds to a transit time of 5 milliseconds within said fiber 16. It can then be considered that the pulse generated by means of the amplitude modulator 33 has a time-duration of 100 nanoseconds, for example.

What is claimed is:

1. An optical device for sustaining a radiant energy pulse which circulates within a monomode waveguide, said device being constituted by a monomode optical waveguide in which is circulated a first wave consisting of a radiant energy pulse produced by a coherent source, optical connecting means being optically coupled to the end faces of said waveguide in order to form a circulation loop, wherein said optical connecting means consist of an interaction medium in which a phase grating has been photoinduced by the interference of two beams produced by said coherent source, said medium being coupled to the two end faces of said waveguide through the intermediary of optical focusing means, the energy of a pumping wave being transferred to said first wave via said medium and said pumping wave being derived from said coherent source, said energy being sufficient to sustain the radiant energy pulse which circulates within said loop.

2. An optical device according to claim 1, wherein said monomode waveguide is a monomode optical fiber.

3. An optical device according to claim 1, wherein the material constituting said interaction medium is gelatin.

4. An optical device according to claim 1, wherein the optical focusing means are converging lenses.

5. An optical device according to claim 1, wherein a splitter plate is interposed on the path of the radiant energy pulse.

6. An optical device according to claim 1, wherein a beam separator is placed at the exit of said coherent source and one of the beam components makes it possible after passing through an amplitude modulator and a beamwidener to insert said radiant energy pulse into the loop by means of a splitter plate.

7. A device according to claim 1, wherein the pumping wave is produced by a laser and passes through a phase modulator.

8. A device according to claim 7, wherein said phase modulator serves to adjust the relative phase shift between the pumping wave and the first wave which impinges on the medium.

9. A device according to claim 8, wherein said phase shift is adjusted to $\pi/2$.

10. A device according to claim 1, wherein a detector receives a pumping wave which is not diffracted by the medium.

11. A gyrometer comprising an optical device according to claim 1.

12. A hydrophone comprising an optical device according to claim 1.

* * * * *